United States Patent [19]
Kanbar

[11] Patent Number: 5,904,283
[45] Date of Patent: May 18, 1999

[54] NOTE PAPER SHEET DISPENSER

[76] Inventor: Maurice S. Kanbar, 2140 Pacific Ave., Apt. 503, San Francisco, Calif. 94115

[21] Appl. No.: 08/644,220

[22] Filed: May 10, 1996

[51] Int. Cl.$^6$ .................................................. B23Q 15/00
[52] U.S. Cl. ................................ 225/10; 225/11; 225/16; 225/77; 83/649; 83/949; 83/435.2
[58] Field of Search ................................ 225/10, 11, 12, 225/13, 14, 15, 16, 77; 83/649, 650, 949, 435.2

[56] References Cited

U.S. PATENT DOCUMENTS

| | | | |
|---|---|---|---|
| 2,495,389 | 1/1950 | Sammann | 225/10 |
| 2,617,198 | 11/1952 | Sharpe | 225/11 |
| 3,507,428 | 4/1970 | Liebreich | 225/11 |
| 3,730,409 | 5/1973 | Ratti | 225/14 |
| 5,370,916 | 12/1994 | Olsen | 225/16 |
| 5,417,783 | 5/1995 | Boreali et al. | 225/14 |
| 5,478,000 | 12/1995 | Jensen | 225/10 |
| 5,540,369 | 7/1996 | Boreali et al. | 225/100 |

*Primary Examiner*—M. Rachuba
*Assistant Examiner*—Sean A. Pryor
*Attorney, Agent, or Firm*—Michael Ebert

[57] ABSTRACT

A note paper sheet dispenser adapted to supply a user with a note paper sheet whose dimensions are determined by the user. The dispenser includes a rectangular base above whose rear end is mounted for rotation a strip paper roll in which the underside of the paper strip is coated with a longitudinal band of low-tack pressure-sensitive adhesive. Mounted above the base is an endless conveyer belt which runs between a motor-driven roller adjacent the paper roll and an idler roller adjacent the front end of the base. When the motor is energized, the belt then draws paper strip from the roll along the belt to a length depending on the time period during which the motor is energized. A tear-off blade above the belt and adjacent the roll permits the length of paper strip lying in the belt to be torn off to provide a note paper sheet of the desired length that can be written on and then temporarily adhered to a document or other object.

7 Claims, 1 Drawing Sheet

U.S. Patent      May 18, 1999      5,904,283
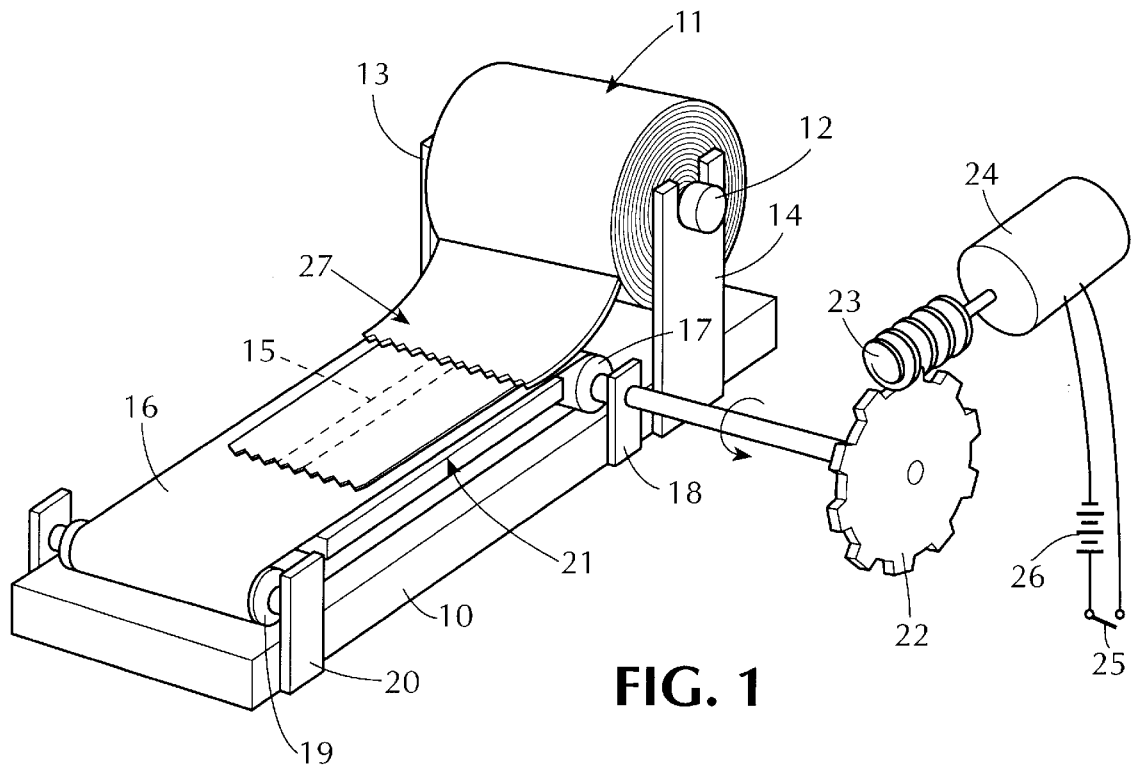
FIG. 1
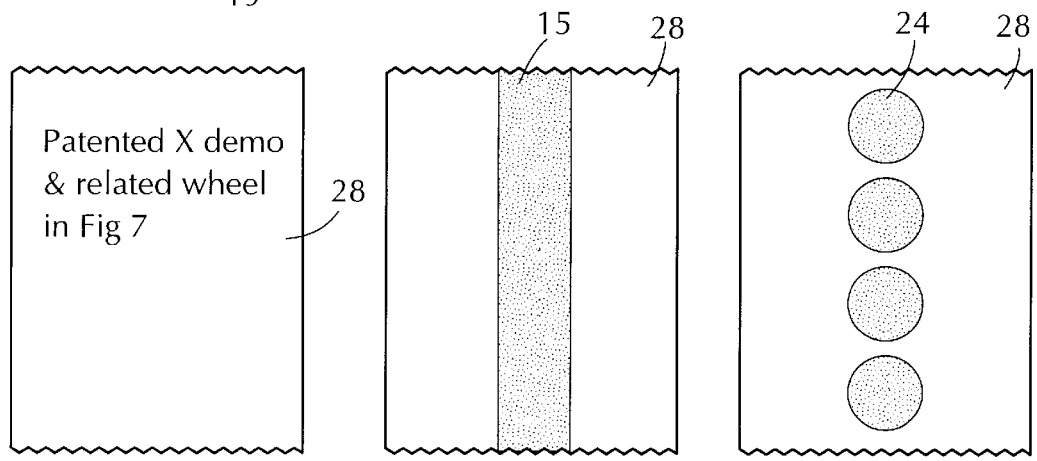
FIG. 2      FIG. 3      FIG. 4
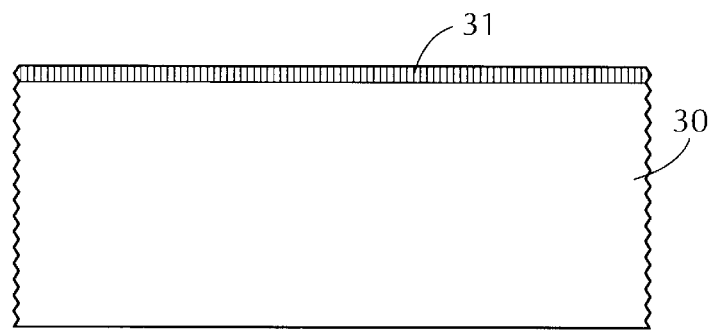
FIG. 5

NOTE PAPER SHEET DISPENSER

BACKGROUND OF INVENTION

1. Field of Invention

This invention relates generally to a note paper sheet which can temporarily be adhered to a document or other object, the sheet having a band of low-tack pressure-sensitive adhesive coated on its underside, and more particularly to a dispenser adapted to) supply a user with a note paper sheet of this type in dimensions determined by the user.

2. Status of Prior Art

Available on the market is the well-known POST-IT note paper, sheet produced by 3M, also the maker of Scotch tape and other products which make use of pressure-sensitive adhesives. A POST-IT sheet has a band of low-tack pressure-sensitive adhesive coated on its underside. Hence when a note is written on this sheet, it may then temporarily be adhered to a document or other object.

Thus if a user wishes to attach a brief note to a copy of a U.S. patent uncovered in a search calling attention to the fact that this patent discloses a particular feature of interest, he can do so with a POST-IT sheet which after it has served its purpose can readily be detached from the patent copy without injury thereto.

Had the pressure-sensitive adhesive been of the high-tack type, such as that found in Scotch tape, and a sheet of note paper attached to the copy of the patent by this tape, because of the resultant strong bond, it would be difficult to later remove the tape without tearing the paper of the patent copy.

Though POST-IT sheets are highly useful, they suffer from two practical disadvantages:

(1) POST-IT sheets are provided in pad form, a stack of such sheets all, of the same size, being pasted together at the upper edge of the stack. Since a user of POST-IT sheets all, for different applications require sheets of different dimensions, such as a small size sheet for a brief note, a medium size sheet for a longer note, and large and extra-large size sheets for still longer notes to be written on the sheet, the present practice is to make available to a user POST-IT pads in a range of different sizes.

Thus a typical user of POST-IT's must keep on his desk or elsewhere several POST-IT pads in different sizes and then select for use whatever pad is appropriate to the note to be written and to the document or object to which the note is to be attached. And since some pads of different size are used more often than others, the sheets in the more-frequently used pads are depleted before those on the infrequently used pads. Hence the user must acquire and maintain an inventory of several pads, and this can be a nuisance and also somewhat costly.

(2) In a POST-IT pad, each sheet has on its under-surface adjacent the upper edge of the pad a band of pressure-sensitive adhesive. The reason this band is so placed is that it does not then interfere with the ability of the user to peel the sheet off the pad, as would be the case had the band been placed closer to the free end of the sheet and cause the sheets in the pad to stick together.

But when this sheet whose adhesive band is next to its upper edge is adhered to a document or other object, the remaining portion of the sheet is free to curl. Such curling does not usually take place in a small POST-IT sheet, but is more likely to happen in larger sheets. And when the sheet is curled, its notation is then more difficult to read. Moreover, the curled sheet can easily be brushed off the document to which it is temporarily adhered.

SUMMARY OF INVENTION

In view of the foregoing, the main object of this invention is to provide a note paper sheet dispenser adapted to supply a user with a note paper sheet having a pressure-sensitive adhesive band coated on its underside, the dimensions of the sheet yielded by the dispenser being determined by the user.

A significant advantage of a dispenser in accordance with the invention is that it does away with the need for a range of note paper pads in various sizes, for the dispenser is capable of providing a note paper sheet in any desired size. Another advantage of the dispenser is that sheets of different length are derived from a large roll of strip paper so that the sheet capacity of the dispenser is substantial, and when exhausted, one has only to install a fresh roll in the dispenser.

Also an object of the invention is to provide a dispenser which yields rectangular note paper sheets having an underlying band of pressure-sensitive adhesive extending along the longitudinal center of the sheet, so that regardless of the length of the sheet it can be effectively attached to a document or other object and will not curl.

Briefly stated, these objects are attained by a note paper sheet dispenser adapted to supply a user with a note paper sheet whose dimensions are determined by the user. The dispenser includes a rectangular base above whose rear end is mounted for rotation a strip paper roll in which the underside of the paper strip is coated with a longitudinal band of low-tack pressure-sensitive adhesive. Mounted above the base is an endless Conveyer belt which runs between a motor-driven roller adjacent the paper roll and an idler roller adjacent the front end of the base. When the motor is energized, the belt then draws paper strip from the roll along the belt to a length depending on the time period during which the motor is energized. A tear-off blade above the belt and adjacent the roll permits the length of paper strip lying in the belt to be torn off to provide a note paper sheet of the desired length that can be written on and then temporarily adhered to a document or other object.

BRIEF DESCRIPTION OF THE DRAWING

For a better understanding of the invention reference is made to the detailed description to follow which is to be read in conjunction with the accompanying drawings of which:

FIG. 1 schematically shows a note paper sheet dispenser in accordance with the invention;

FIG. 2 illustrates the front face of a short sheet of note paper yielded by the dispenser;

FIG. 3 is the rear face of the same short sheet which is coated with a band of pressure-sensitive adhesive;

FIG. 4 shows an alternative form of the adhesive band; and

FIG. 5 is the front face of a longer sheet of note paper yielded by the dispenser.

DETAILED DESCRIPTION OF INVENTION

Referring now to FIG. 1 there is shown schematically a note paper sheet dispenser in accordance with the invention, the dispenser including a hollow rectangular base 10 adapted to accommodate the drive mechanism of the dispenser. Supported above the rear of the base is a strip paper roll 11. The roll is supported on a shaft 12 whose ends are received in bearing slots formed at the upper ends of a pair of vertical stands 13 and 14 attached to opposite sides of the base.

Thus when the roll is exhausted it may be replaced by a fresh roll, the shaft going back into the slots.

The underside of paper strip roll 11 is coated with a band 15 of a low-tack pressure-sensitive adhesive 15. This band extends in a longitudinal path along the center line of the paper strip the full length of the strip spiralled in the roll.

The low-tack adhesive 15 may be of the type used in a POST-IT sheet.

A pressure-sensitive adhesive is an elastomeric mass coat that will give a bond of at least moderate strength upon application of light pressure thereto at room temperature. A high-tack pressure-sensitive adhesive such as solvent cements based on natural rubber have the ability to develop at least moderate adhesive strength upon contact with the adherent. But for purposes of the invention, the pressure-sensitive coating on the paper strip roll must be a low-tack composition, so that it adheres lightly to the adhered and can easily be detached therefrom when the sheet of note paper has served its purpose.

Mounted above base 10 and parallel thereto is an endless conveyer belt 16 of fabric or other suitable material which runs between a motor-driven roller 17 adjacent paper roll 11 at the rear of the base and supported for rotation by bearing stands 18 attached to opposite sides of the base, and an idler roller 19 adjacent the front end of the base and supported for rotation by bearing stands 20.

Underlying the upper course of endless belt 16 is a metal platen 21, the upper course sliding along the platen which maintains the upper course in a planar state and prevents it from bowing.

The shaft of roller 17 terminates in a drive gear 22 which is engaged by a worm gear 23 coupled to the armature shaft of a dc-motor 24. Motor 24 is connected through a push button switch 25 to a battery power source 26. When switch 25 is closed by a user of the dispenser, the motor is energized to turn roller 17 and thereby cause the upper course of the endless belt 16 to travel toward the idler roller 19, and the lower course of the belt to travel toward motor-driven roller 17.

The operating speed of motor 24 and the gear reduction ratio of gears 22 and 23 are such as to cause the belt to advance at a relatively slow rate, such as 2 feet per minute. Hence by keeping the button switch closed 23 for a few seconds, one can draw paper strip from the roll in a length determined by the duration of the time period in which switch 25 is maintained by the user in a closed state.

Bridging stands 13 and 14 in front of paper roll 11 is a cutting blade 27 having a concave cross section, and a serrated edge. Paper drawn from roll 11 passes through a nip between the cutting edge of blade 27 and the surface of the upper course of the conveyer belt. Because the underside of the paper strip has a low-tack pressure sensitive adhesive band thereon, the paper strip lightly adheres to the belt. And when motor 24 is energized to advance the conveyer belt, the belt then acts to draw paper strip from the roll and to thereby unwind the roll.

The length of paper strip drawn from the roll and overlying the upper course of conveyer belt 16 depends on the duration of the period during which motor 24 is energized. Obviously, the longer this period, the greater the length of the paper strip on the belt. Thus in FIG. 1 the length L of the paper sheet which is the distance of the strip from its free end to the serrated edge of cutting blade 21 is fairly long. When therefore the user tears off this paper strip, he then has a fairly long note paper sheet.

But the user may control motor 24 to produce a note paper sheet of whatever length he needs, whether a very short, very long or any intermediate length, this depending on the use to which the sheet is to be put.

Thus FIG. 2 show the front face of a short paper sheet 28 on which the user has written a brief note in regard to a patent to which the note sheet is to be temporarily attached. FIG. 3 shows the rear face of sheet 28 on which there is a band 15 of pressure-sensitive adhesive that runs longitudinally through the center line of the sheet.

Because the longitudinal center-line runs the full length of sheet 28 and is symmetrical with the opposing sides of sheet 28, there is little tendency of the sheet to curl when it is attached to a document or other object.

In FIG. 4, instead of a continuous band of pressure-sensitive adhesive, sheet 28 is provided with a band formed from a row of equi-spaced large adhesive spots 29. These serve to further reduce the adhesion of the sheet to the document to which it is adhered. Or a pattern of small adhesive dots may be applied to a narrow longitudinal path on the underside of the paper strip by an ink jet printer mechanism.

And as shown in FIG. 5, one can tear off from the dispenser a much longer sheet 30 of postable note paper; the limit in the length of the sheet being effectively the length of the conveyer belt 16.

FIG. 1 shows the dispenser structure schematically, for in practice the drive motor, the associated gears, the battery and the control switch are housed in the hollow base 10 to provide a compact dispenser.

POST-IT pads in current use all have yellow-colored paper sheets, and these may not afford adequate contrast when a sheet is adhered to a document or other object. But in a dispenser in accordance with the invention, the paper strip forming the roll may be of white paper or paper of other colors.

And while the paper strip must be processed to apply an adhesive band to its underside, it may be further processed to apply along one edge of the face of the strip a continuous stripe of a marker color. Thus in FIG. 5, the note paper sheet 30 which may be of white paper has printed along one edge a color stripe 31 which may be red, black or in any other contrasting color, and thereby color code the note. Thus a sheet having a red marker stripe indicates that the note requires immediate attention, while one having a green marker stripe indicates that the note is of incidental importance.

In a more compact and less expensive version of a note paper sheet dispenser in accordance with the invention, instead of a motor-driven endless conveyer as shown in FIG. 1, use is made of a pinch roller motor-driven to draw the paper strip from the roll beyond a cutting blade mounted adjacent the roll.

The length to which the paper strip is pulled out depends on the time period in which the roller motor is electrially energized under the control of the user, as in FIG. 1. When a paper strip of a desired note sheet length is produced, it is then torn off on the blade and put to use.

Thus the user has no need to maintain an inventory of POST-IT pads in a range of different sizes, for whenever the user needs a note paper sheet of a particular size, he simply presses a button to cause the dispenser to yield this sheet.

While there has been shown a preferred embodiment in accordance with the invention, it is to be understood that many changes may be made therein without departing from the spirit of the invention.

I claim:

1. In combination with a strip paper roll, a note paper sheet dispenser adapted to supply a user with a note paper sheet drawn from the roll whose dimensions are determined by the user; said dispenser comprising:

A. a rectangular base;

B. said strip paper roll having a paper strip whose underside is coated along a longitudinal center line with a continuously longitudinally extending band of low-tack pressure sensitive adhesive, said roll being mounted for rotation above the base adjacent the rear end thereof;

C. an endless conveyer belt driven by a motor, said belt being mounted above said base and extending between said roll and the front end of the base, said belt when the motor is energized under the control of the user, then functioning to draw paper strip from the roll along the belt in a length which depends on the time period during which the motor is energized; and D. means adjacent the roll to tear off the length of paper strip drawn therefrom, said means being formed by a serrated blade mounted adjacent the roll, whereby the length of strip torn off the roll is equal to the distance between the blade and the end of the strip on the belt.

2. A dispenser as set forth in claim 1, in which the band is formed by a row of circular dots.

3. A dispenser as set forth in claim 1, in which the roll is supported on a shaft bridging a pair of upright bearing stands attached to opposite sides of the base.

4. A dispenser as set forth in claim 1, in which the endless belt extends between a motor-driven roller adjacent the paper roll and an idler roller adjacent the front end of the base.

5. A dispenser as set forth in claim 4, in which the motor-driven roller is coupled to the motor through reduction gears.

6. A dispenser as set forth in claim 5, in which the motor is a d-c motor and is energized through a user-operated switch by a battery.

7. A dispenser as set forth in claim 1, in which a colored marker stripe is printed on the other side of the paper strip.

\* \* \* \* \*